United States Patent [19]
Russell et al.

[11] 3,815,190
[45] June 11, 1974

[54] CUTTING OR ABRADING ELEMENTS

[75] Inventors: Edward David Russell, Rotherham; George William Ronald Shelton, Dore, both of England

[73] Assignee: Stanley Tools Limited, Woodside, Sheffield, England

[22] Filed: July 24, 1972

[21] Appl. No.: 274,666

[30] Foreign Application Priority Data
Apr. 20, 1972  Great Britain .................... 18447/72

[52] U.S. Cl. ..................................... 29/78, 76/101
[51] Int. Cl. ..................... B23d 71/00, B21k 21/00
[58] Field of Search ............ 29/78, 79; 76/24, 101 S

[56] References Cited
UNITED STATES PATENTS

| | | |
|---|---|---|
| 1,727,690 | 9/1929 | Anheuser ................................. 29/78 |
| 2,058,912 | 10/1936 | Reid ........................................ 29/78 |
| 2,622,310 | 12/1952 | Luchsinger .............................. 29/78 |
| 2,678,571 | 5/1954 | Booth ................................ 76/101 S |
| 2,703,119 | 3/1955 | Pullen ..................................... 29/78 |
| 2,984,892 | 5/1961 | Oxford et al. ........................... 29/78 |
| 3,509,611 | 5/1970 | Kifer ....................................... 29/78 |

FOREIGN PATENTS OR APPLICATIONS
584,480  10/1959  Canada .............................. 76/101 S

*Primary Examiner*—Harrison L. Hinson
*Attorney, Agent, or Firm*—Prutzman, Hayes, Kalb & Chilton

[57] ABSTRACT

A cutting and abrading element of sheet metal has a multiplicity of apertures in arcuate rows with several spaced-apart apertures in each row, the concave side of each row facing the direction of cut, trailing edges of the apertures protruding to form cutting edges. The circle centres are all to one side of the axis, the cutting edges near that side of the element extending transversely of the axis, with the cutting edges of one row laterally staggered relative to the cutting edges of another row, whilst the cutting edges near the other side of the element are directly one behind another and at obtuse angles to the axis, to produce different cutting and abrasing effects from one side of the element than the other.

5 Claims, 3 Drawing Figures

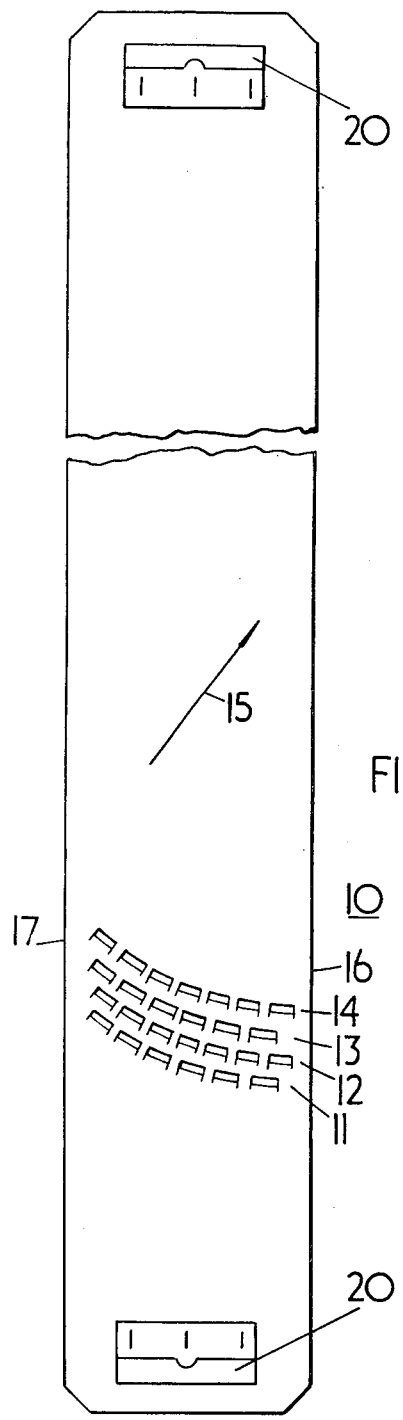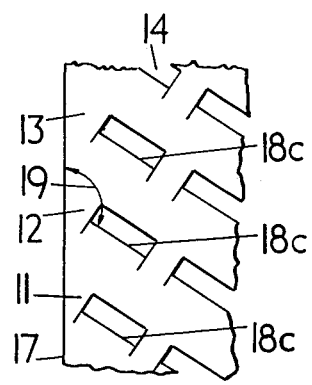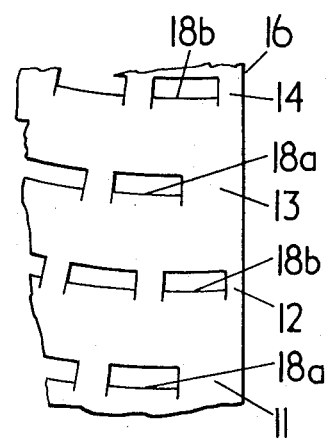
FIG.1.
FIG.2.
FIG.3.

CUTTING OR ABRADING ELEMENTS

BACKGROUND OF THE INVENTION

This invention relates to cutting and abrading elements of sheet material for cutting and abrading workpieces.

Known cutting and abrading elements of sheet material, having a multiplicity of apertures and a corresponding multiplicity of cutting or abrading teeth, are good for cutting metals but tend to become clogged when used for cutting and abrading some of the modern synthetic plastics materials. Moreover they are comparatively expensive to manufacture, requiring complex tooling. Furthermore, in one particular mode of use, smoothing off the ends of pipes, the cutting teeth tend to be damaged.

SUMMARY OF THE INVENTION

According to the invention there is provided a cutting or abrading element of sheet material for cutting or abrading a workpiece, said element comprising a multiplicity of mutually spaced apart apertures therethrough, said element also comprising a corresponding multiplicity of mutually spaced apart cutting teeth each adjacent a trailing edge of a respective associated one of said apertures, each tooth and each associated aperture being small in relation both to the width and to the length of said element, the orientation of the teeth changing progressively from one part of the blade to another part of the blade.

The associated apertures and cutting teeth are arranged in rows extending across the element from adjacent one side of the element. The rows are curved so that each row is concave to the front, each row defining an arc of a respective circle and each tooth being oriented so as to be substantially tangential to the respective arc, the centre of the circle lying to one side of a longitudinal axis of the element.

In one embodiment, the rows stop short of the two sides, (although this is not essential,) to leave border regions without teeth and associated apertures. The phases "adjacent one side" and "adjacent an opposite side" should be construed accordingly.

The teeth are oriented to extend substantially transversely to the longitudinal axis of the element in one side region of the element; the teeth and associated apertures overlap laterally of the element in said one side region so that each space between adjacent cutting teeth and associated apertures is immediately in front of another cutting tooth and associated aperture and/or is immediately behind another cutting tooth and associated aperture in said one side region; the teeth extend at at least one angle to said axis in an opposite side region of said element such that the outer end of each tooth is further forward than its inner end in said opposite side region; and the teeth and associated apertures in said opposite side region are arranged in columns one directly behind another; whereby said one side region produces a different cutting or abrading effect from said opposite side region.

Preferably each tooth and associated aperture is produced by means of a punch and die, the die face having an aperture to receive the punch and a chamfer along one edge of the die aperture so that the punch in forming the aperture pushes the tooth into the chamber so that the tooth projects from a face of the element before the punch and die together shear a blank from the element so as to form the tooth.

The element may be flat or curved transversely or curved longitudinally.

The element if flat or curved transversely may have longitudinal edge portions which are folded, to have a stiffening effect at an angle of between 45° and 270° to a non-cutting face of the element if the element is flat or to the chord of the arc of the element (on the concave side) if the element is curved transversely.

BRIEF DESCRIPTION OF DRAWINGS

FIG. 1 is a plan view of a cutting and/or abrading tool element forming the above-mentioned embodiment of the invention;

FIG. 2 is a scrap view of part of the element of FIG. 1 to an enlarged scale, and FIG. 3 is a scrap view of another part of the element of FIG. 1 also to an enlarged scale.

DESCRIPTION OF THE PREFERRED EMBODIMENT

The cutting and/or abrading tool element 10 illustrated in FIGS. 1, 2 and 3 consists of a generally rectangular sheet metal member having several rows of apertures therein with several apertures in each row. FIG. 1 shows four such rows 11, 12, 13 and 14, but in fact there are very many more rows occupying the whole length of the element 10. Each row defines an arc of a respective circle having its centre to one side of a longitudinal axis (not shown) of element 50 extending vertically in FIGS. 1 to 3. As shown in FIG. 1, alternate rows have six and seven apertures spaced apart from each other therein, but may have more or less. For example, rows 11 and 13 each have six apertures whilst rows 12 and 14 each have seven apertures.

Each row of apertures is associated with a corresponding row of cutting or abrading teeth adjacent the trailing (long) edges of the apertures.

Thus, element 10 has several rows of teeth with several teeth in each row and with associated apertures for cut or abraded material to pass through, each row being arcuate in shape or curved with the concave side facing generally in the longitudinal or "forward" direction of the element, (vertically upwards in FIGS. 1 to 3,) though the direction of cut may be either vertically upwards in each of FIGS. 1 to 3, or in the direction of arrow 15, that is to say, at an angle to the longitudinal or "forward" direction of the element 10; the rows are all one behind another in relation to the said forward direction.

The ends of the rows adjacent one side 16 of the element 10 are rearwardly displaced in relation to the corresponding ends of the rows adjacent the other side 17 of the element 10, having regard to the longitudinal direction of the element and the upward direction (as seen in the drawings) in which it is moved during cutting or abrading.

As shown clearly in FIG. 3, the cutting edges 18a, and 18b near the first-mentioned ends of the rows (adjacent side 16) extend substantially transversely to the longitudinal axis, that is, substantially perpendicularly to side 16 and are laterally staggered in relation to each other, (see for example the cutting edges 18a near the ends of rows 11 and 13 adjacent side 16,) which are further away from side 16 than the cutting edges 18b, near the ends of rows 12 and 14 adjacent side 16.

As shown in FIG. 2, the cutting edges 18c, near the ends of (all) the rows adjacent side 17 make respective obtuse angles, such as angle 19, with side 17, so that the outer end of each tooth is further forward than its inner end; the cutting edges 18c lying in columns substantially one directly behind another in the longitudinal direction of the element, with only insignificant lateral staggering, (too little to be shown in the drawings).

The element 10 has hooks 20 at the ends thereof for attachment of the element to a holder, not shown.

If the holder is of a form similar to known "Surform" blade element holders used with "Surform" blade elements of the same shape in outline as the element 10, it may be found more convenient to move the element 10 in the direction of arrow 15, (at an angle of about 35° to the longitudinal direction of element 10), or at another angle in the range of, say, 10° to 45° to the longitudinal direction of the element 10, than in the longitudinal direction itself of the element 10, in which case the cut produced by the element in the region adjacent side 17 will be of a different nature from the cut produced by the element in the region 16.

The above-described and illustrated elements are comparatively inexpensive to manufacture, the tools required being of simple forms. The elements cut or abrade both metals and plastics well, with good chip clearance in the case of plastics.

MODIFICATIONS

Cutting and abrading elements in accordance with the invention may be flat as described above or may be transversely or longitudinally curved, as mentioned in the Summary. They may alternatively be cylindrical, that is, of circular cross-section, or of U-shaped cross-section or three-sides-of-a-rectangle (including a square) cross-section or of V-shaped cross-section, for various cutting and abrading tasks.

CROSS-REFERENCE TO CO-PENDING PATENT APPLICATION

A cutting and abrading element of sheet material having symmetrical arcuate rows of apertures and associated cutting teeth is described illustrated and claimed in a co-pending patent application Ser. No. 274,665 of even date filed by one of us, namely, Edward David Russell. That element does not produce a different cutting and abrading effect on one side from the other side. Reference is particularly directed to the specification and drawings of the aforesaid co-pending patent application for an understanding of the tools required and method of forming arcuate rows of apertures and associated cutting teeth, equally applicable to the instant invention, subject to modifications obvious to those skilled in the art to allow for the circle centres being to one side of the longitudinal axis of the element.

What is claimed is:

1. A cutting and abrading blade comprised of sheet material of rectilinear configuration having a forward end and longitudinally extending sides, said blade being adapted for stabilized linear movement over a workpiece in a direction generally toward said forward end and comprising a multiplicity of individual spaced-apart apertures and a multiplicity of associated cutting teeth forming the trailing edges of said apertures, said teeth having substantially straight cutting edges extending transversely of said sides, the apertures and associated teeth being arranged in arcuate rows extending across said sheet material, each row defining an arc and being comprised of a plurality of said individual apertures and associated teeth to effect discrete multiple chip removal of material by each row of teeth, said rows being generally concave relative to the said forward end, the teeth adjacent one longitudinal side having cutting edges extending at substantially a right angle thereto, the orientation of the teeth within each row progressively changing across the sheet material relative to the forward linear working direction so that said substantially straight edges are substantially tangential to their respective arc and a majority thereof operate at least partly in shear irrespective of the particular forward linear movement employed.

2. The cutting and abrading blade of claim 1 wherein the apertures and associated teeth in each row adjacent said one longitudinal side are staggered relative the apertures and associated teeth in each immediately adjacent row.

3. The cutting and abrading blade of claim 1 wherein each row defines an arc of a respective circle with the center of the circle located adjacent said one longitudinal side and each tooth within a row is oriented so as to be substantially tangential to the respective arc.

4. The cutting and abrading blade of claim 1 wherein the teeth adjacent the side opposite said one side are oriented such that the outer end of each tooth is further forward than its inner end.

5. The cutting and abrading blade of claim 4 wherein the teeth and associated apertures adjacent the side opposite said one side are arranged in columns one directly behind another whereby the teeth adjacent opposite side edges produce different cutting and abrading effects.

* * * * *